United States Patent

Lynn et al.

[11] Patent Number: 5,567,283
[45] Date of Patent: Oct. 22, 1996

[54] CAUSTIC CONCENTRATION REGULATOR FOR CHLORINE GENERATORS

[76] Inventors: Scott Lynn, 37 Janin Pl., Pleasant Hill, Calif. 94523; Steven F. Sciamanna, 222 Rheem Blvd., Moraga, Calif. 94556; Aldo F. Sciamanna, 3963 Oakmore Rd., Oakland, Calif. 94602

[21] Appl. No.: 535,853

[22] Filed: Sep. 28, 1995

[51] Int. Cl.$^6$ ............... C25B 9/00; C25B 15/08; G05D 11/00; F16K 31/08
[52] U.S. Cl. ............... 204/228; 204/237; 204/263; 204/266; 137/91; 137/101.27; 137/423; 137/426; 137/429; 251/65
[58] Field of Search ............... 137/423, 426, 137/429, 91, 101.27; 251/65; 204/237, 263, 266, 228

[56] References Cited

U.S. PATENT DOCUMENTS

| | | | |
|---|---|---|---|
| 3,208,471 | 9/1965 | Olsen | 251/65 X |
| 3,274,094 | 9/1966 | Klein | 251/65 X |
| 3,793,163 | 2/1974 | Dotson | 204/98 |
| 3,976,549 | 8/1976 | Falvo | 204/1 R |
| 4,206,157 | 6/1980 | Plasmati | 137/91 X |
| 4,308,123 | 12/1981 | Lynn | 204/266 |
| 4,500,404 | 2/1985 | Tucker | 204/266 |
| 4,613,415 | 9/1986 | Wreath et al. | 204/98 |
| 4,693,806 | 9/1987 | Tucker | 204/252 |
| 4,781,810 | 11/1988 | Tucker | 204/228 |
| 4,899,774 | 2/1990 | Keller, Jr. | 137/91 X |
| 4,982,755 | 1/1991 | Moran et al. | 137/91 X |
| 5,025,827 | 6/1991 | Weng | 137/429 |

Primary Examiner—Donald R. Valentine
Attorney, Agent, or Firm—Townsend and Townsend and Crew LLP

[57] ABSTRACT

An electrolytic chlorine gas generating system is disclosed. The system includes an electrolytic cell generating the chlorine gas, a brine tank supplying saturated brine to the anode compartment of the cell, and an acid feed tank containing hydrochloric acid at sufficient concentration to maintain the anolyte brine at less than about pH 4.0. In operation, the brine tank contains solid sodium chloride which dissolves in the brine and replenishes the anolyte brine solution as chloride ion is consumed during electrolysis. The acid feed tank is in fluid communication with the brine tank so that the brine is maintained at a constant volume during electrolysis. A caustic system is also disclosed including a means for controlling caustic delivery.

4 Claims, 3 Drawing Sheets

CAUSTIC CONCENTRATION REGULATOR FOR CHLORINE GENERATORS

BACKGROUND OF THE INVENTION

This invention relates to the generation of chlorine and sodium hydroxide from sodium chloride by electrolytic means using an electrolytic cell having an anode compartment, a cathode compartment, and a cation-exchange membrane separating the two compartments. More particularly, this invention relates to apparatus for generating chlorine electrolytically in a continuous process for such purposes as the treatment of water in swimming pools, treatment of water in remote locations for drinking, and for other such relatively small-scale purposes. More specifically, this invention relates to a set of methods of operating a small-scale, membrane-type electrochemical chlorine generator. These methods may be applied to several different designs of generator in addition to the design described below. These methods promote safe and highly efficient chlorine generation and facilitate the addition of chemicals for controlling the pH of the treated water and for stabilizing the chlorine in it.

There is frequently a need for the generation of chlorine, for use as a disinfectant in water, on a scale of the order of one to one hundred pounds per day. Examples are the sanitizing of swimming pools, the treatment of small water supplies or sewage systems, the prevention of algae growth in cooling towers, etc. In most of these applications the pH of the water being treated must be kept within narrow limits, for example 7.5±0.1 pH units. Since chlorine is an acid gas, its use must be coupled with the addition of a chemically equivalent quantity of a basic compound if the pH of the treated water is to be kept constant. The most commonly used base for this purpose is sodium carbonate (soda ash). A buffering agent (usually sodium bicarbonate) is frequently added to the water being chlorinated to stabilize the pH so that little change in the pH of the water results from small fluctuations in the flows of the chlorine and neutralizing agent when both are being added nearly continuously.

Chlorine is highly toxic, so its use in the form of the liquified gas (commonly sold in steel cylinders holding 75 pounds or more) presents a significant hazard. For this reason chlorine is also sold in the form of a concentrated solution of sodium hypochlorite (NaOCl, sometimes called "liquid chlorine" or swimming pool bleach) or as the solid calcium hypochlorite ($CaOCl_2$, "solid chlorine" or bleaching powder). These substances, which are quite costly relative to liquified chlorine gas, usually contain, respectively, excess sodium hydroxide or calcium oxide. Hence their use increases the pH of the water to which they are added and necessitates the frequent, or continuous, addition of hydrochloric acid (HCl or muriatic acid) to keep the pH constant. A second form of solid chlorine, chlorinated cyanuric (or isocyanuric) acid, has less tendency to cause pH drift but is so expensive that only in small pools can it be used as the sole method of chlorination. (The use of cyanuric acid as a chlorine stabilizer is discussed below.)

Another alternative to the use of liquified chlorine gas is to generate chlorine on site by the electrolysis of a concentrated aqueous solution of sodium chloride (NaCl or salt) in a two-compartment electrolytic cell. The two compartments are separated with a liquid-tight seal by an ion-exchange membrane (typically one of the DuPont Series 300 Nafion membranes). In the anode compartment chlorine is formed by discharge of chloride ion while sodium ion and water molecules are transported through the membrane. In the cathode compartment hydrogen and sodium hydroxide (NaOH) are generated. Patents for such devices have been granted during the past decade or so to, among others, Lynn (U.S. Pat. No. 4,308,123 [1981]), Tucker (U.S. Pat. Nos. 4,500,404 [1985], 4,693,806 [1987] and 4,781,810 [1988]) and Wreath & Keller (U.S. Pat. No. 4,613,415 [1986]).

However, there remains a need for improved electrolytic chlorine generators.

SUMMARY OF THE INVENTION

The present invention provides electrolytic chlorine gas generators significantly improved in operational safety, efficiency, reliability and convenience over earlier devices. Generally, the chlorine is used to treat (i.e. disinfect) water. The present chlorine generators include an electrolytic cell generating the chlorine gas, a brine tank supplying saturated brine to the anode compartment of the cell, and an acid feed tank containing hydrochloric acid at sufficient concentration to maintain the anolyte brine at less than about pH 4, and preferably between about pH 1–3, and more preferably between about pH 1–2. The brine tank contains solid sodium chloride which dissolves in the brine and replenishes the anolyte brine solution as sodium and chloride ions are depleted during electrolysis. The acid feed tank is in fluid communication with the brine tank such that the brine is maintained at a constant volume during electrolysis. One suitable method of delivery was described by Lynn U.S. Pat. No. 4,308,123. The concentration of the hydrochloric acid in the acid feed tank is high enough to maintain the anolyte brine pH at the desired level.

In preferred embodiments, sodium hydroxide—which is formed in the cathode compartment of the electrolytic cell—is maintained at a catholyte concentration of between about 1 to 12% by weight by diluting the catholyte with water during electrolysis. More preferably, the sodium hydroxide concentration is maintained at between about 2 to 10%, and most preferably between about 4 to 8%. In some preferred embodiments, a water-flow control system automatically shuts down operation of the electrolytic cell if the sodium hydroxide concentration in the catholyte substantially exceeds a preset maximum concentration (e.g. 10% by weight). The sodium hydroxide solution formed in the cathode compartment is added to the water to be treated. Preferably, it is first added to a mixing tank where it may be combined with one or more water-treatment chemicals such as sodium carbonate, sodium hypochlorite, cyanuric acid, chlorinated cyanuric acid, calcium hypochlorite, and sodium bicarbonate.

In other preferred embodiments, a sweep gas (typically air) is provided to remove chlorine fumes from the air space within the brine tank. The sweep gas also directs chlorine from the anode compartment and hydrogen from the cathode compartment into the water to be treated. The chlorine-laden sweep gas together with the sodium hydroxide solution is injected into a stream of the water to be treated by, for example, a jet pump.

In still other preferred embodiments, a phosphate species (e.g. phosphoric acid or a sodium phosphate) is supplied to the anolyte brine. This is necessary when, as usual, the solid sodium chloride provided to the brine tank and/or the water to dilute the acid contains calcium and/or magnesium salts. Preferably, the phosphate species is provided to the anolyte brine in a quantity of greater than about the total molar amount of calcium and magnesium ions in the feed to the anode compartment. More preferably, the phosphate species is provided at between about 1.5 and 2.5 times, and even more preferably at about twice, the total molar amount of calcium and magnesium ions. Suitable methods of adding phosphate species include the following: a) premixing a selected quantity of a sodium phosphate with the solid sodium chloride in the brine tank, b) premixing a selected quantity of sodium phosphate or phosphoric acid with the hydrochloric acid in the acid tank, and c) premixing a selected quantity of either phosphoric acid or sodium phosphate with the brine in the brine tank. If option (c) is chosen, initially the brine will have an excess of phosphate as explained below.

A further understanding of the nature and advantages of the invention will become apparent by reference to the remaining portions of the specification and drawings.

DESCRIPTION OF THE SPECIFIC EMBODIMENTS

Figure 1:
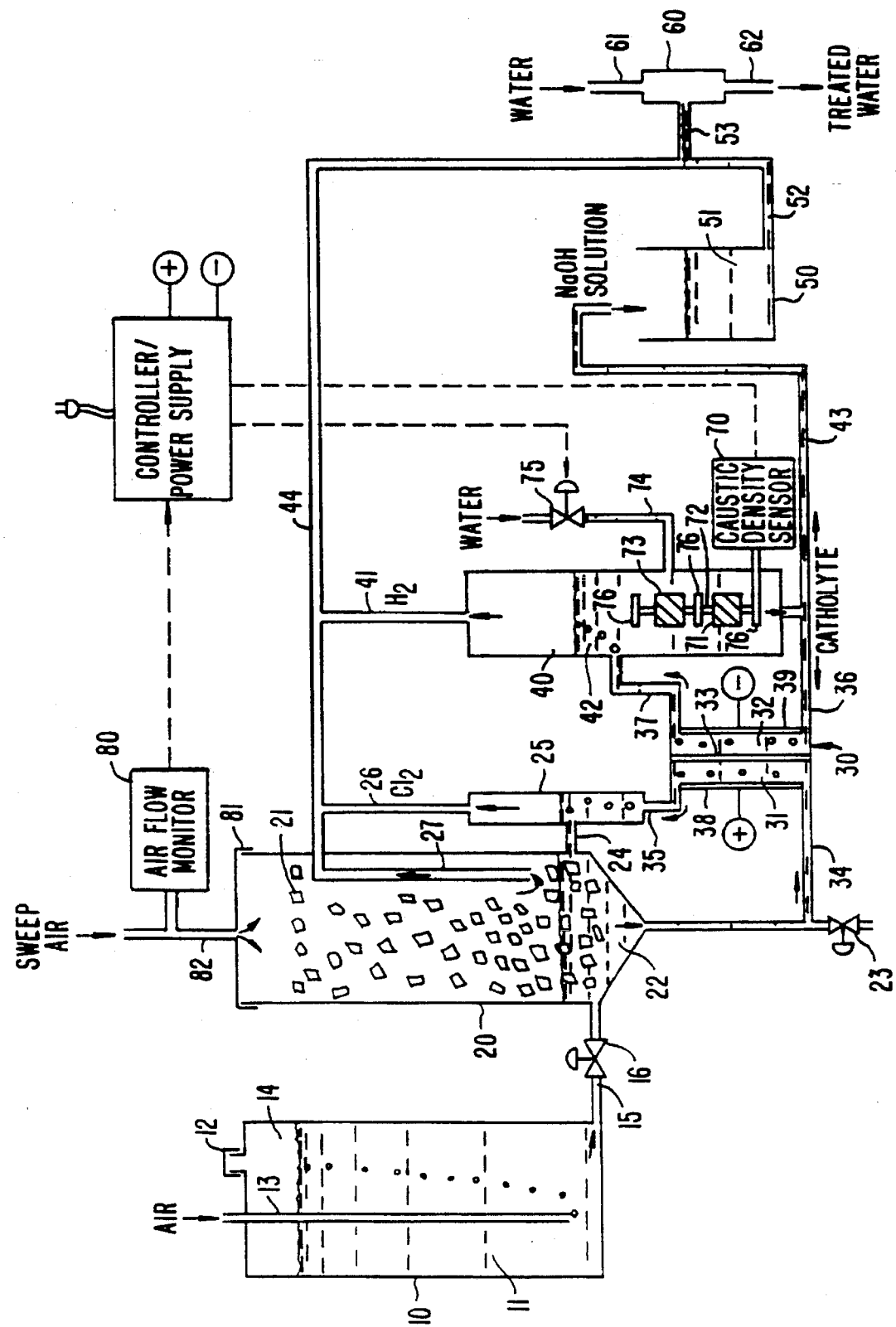
FIG. 1 is a schematic drawing of a preferred chlorine gas generating system of the present invention.

In the operation of an electrolytic chlorine generator it is necessary to offset the transport of water through the membrane by a nearly constant addition of water to the anode compartment, and to maintain the concentration of NaCl in the anolyte at a level near saturation. As is discussed below, we have also found it to be advantageous to operate the chlorine generator with an anolyte brine made acidic by the addition of hydrochloric acid. Thus the present invention provides means to ensure that the inventory of anolyte brine be maintained essentially constant, at the desired acidity, and nearly saturated with NaCl.

A second concern in the electrochemical generation of chlorine is the current efficiency of the device, i.e., the fraction of the electric current that generates useful chlorine product. Inefficiency in the production of chlorine arises when some of the hydroxide ion from the cathode compartment diffuses through the membrane into the anolyte. The following overall ionic reaction then occurs:

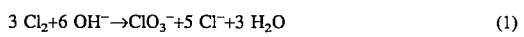

$$3\ Cl_2 + 6\ OH^- \rightarrow ClO_3^- + 5\ Cl^- + 3\ H_2O \qquad (1)$$

The result of this reaction is a loss of chlorine gas and a build-up of sodium chlorate ($NaClO_3$) in the anolyte brine. As the chlorate level in the brine increases, the solubility of NaCl in the brine falls. Oxygen gas will then start forming at the anode as a product of electrolysis, further reducing the efficiency of chlorine production. Reaction (1) becomes increasingly important when the pH in the anode compartment rises above 4.0. We have found that Reaction (1) can be essentially prevented by keeping the pH of the anolyte at or below about 4.0. Preferably, the anolyte pH is maintained at between about 1 and 3, and more preferably between about 1 and 2. The rate of addition of acid required to maintain this pH depends on the flux of hydroxide ion through the membrane. We have found that the hydroxide flux is sensitive to the concentration of NaOH in the cathode compartment; this level should be kept below about 12% and above 1% by weight, preferably between 2% to 10%, and more preferably between 4 to 8%. We have also found that an excessively high concentration of NaOH in the catholyte compartment can lead to irreversible membrane damage as well as a low current efficiency.

In the normal operation of industrial-scale chlorine cells (making chlorine at a rate of hundreds to thousands of pounds of chlorine per day) the concentrations of calcium and magnesium ions in the anolyte brine are maintained at levels of a few parts per billion by weight through a stringent purification process. We have found that maintaining the anolyte brine at a relatively low pH reduces the tendency of calcium and magnesium ions (which are ubiquitous impurities in any commercially available NaCl) to migrate into the ion-exchange membrane where they can react with hydroxide ions and form the respective insoluble precipitates, thereby damaging the membrane. For industrial-scale chlorine cells, Dotson (U.S. Pat. No. 3,793,163 [1974]) has discussed maintaining a phosphate concentration in the anolyte brine sufficient to precipitate the phosphates of calcium and/or magnesium before those ions reach membrane-damaging concentrations. The present invention provides a means of suppressing both the formation of sodium chlorate in the anolyte brine and damage to the cation-exchange membrane during operation of an electrolytic chlorine generator a) by maintaining the concentration of NaOH in the catholyte at a concentration below 12 wt. %, preferably in the range of 2 to 10 wt. %; and/or b) by continuously adding sufficient hydrochloric acid to the anolyte to maintain a pH at or below 4.0; and/or c) by continuously adding phosphoric acid ($H_3PO_4$) or a sodium salt thereof to the anolyte brine in amount of greater than about the combined molar quantities of calcium and magnesium ions; or d) by taking any combination of these measures simultaneously. Unlike the industrial-scale systems to which the method described in Dotson is applied, the systems of this invention operate at relatively low temperatures (e.g. less than about 40° C.). Further, the chlorine generators of this invention can employ a recirculating chlorinated brine, unlike typical high-temperature industrial-scale generators. By adding phosphate as described, it has been found possible to operate a small-scale membrane-type electrolytic cell for chlorine generation without purifying the brine extensively as is done routinely in industrial practice.

Another concern in the operation of an electrochemical chlorine generator is to ensure that objectionable chlorine fumes do not escape from the device. The anolyte brine that circulates between the electrolytic cell and the salt compartment is saturated with dissolved chlorine gas, and chlorine fumes are present in the air above the brine. For practical reasons the generator is operated at very nearly atmospheric pressure. We have found that the best method of ensuring that chlorine fumes do not escape from the generator is to maintain a constant sweeping flow of air into the air space above the brine by providing an injection pump, such as a jet pump or other pumping device of suitable capacity. The sweep air flows down through an opening in the top of the brine tank, mixes with the chlorine being generated, may also entrain the hydrogen released from the cathode compartment, and is injected (together with the product NaOH solution) by the pumping device into the water being treated. A system is provided by this invention to ensure that this flow of sweep air is not interrupted while the chlorine generator is in operation.

The pH of the water treated with the output of an electrolytic chlorine generator operated with a feed of pure NaCl solution would remain constant if all of the chlorine and all of the NaOH remained in the treated water. However, in the treated water the two active chlorine species, HOCl (hypochlorous acid) and OCl⁻ (hypochlorite ion), are in dynamic equilibrium through the reaction $$HOCl \rightleftharpoons H^+ + OCl^- \qquad (2)$$

At a pH of 7.5 the concentrations of HOCl and OCl⁻ are about equal. It is desirable to maintain the pH of the water at this value because HOCl is a more effective sanitizing agent than OCl⁻. However, the compound HOCl is somewhat volatile and some of it will evaporate from treated water that is exposed to air. The loss of HOCl causes the pH of the treated water to rise because hydrogen ions are removed from solution. To offset the evaporation of HOCl from the treated water it is necessary either to add less NaOH to the treated water than is generated together with the chlorine by the electrolysis of NaCl (i.e., to dispose of part of the NaOH solution), or to add an acid to the treated water at regular intervals, or to generate a suitable fraction of the needed chlorine by the electrolysis of HCl. We have found that the quantity of acid required to maintain the desired level of acidity in the anolyte brine, when converted to chlorine by electrolysis, provides most of the chlorine needed to offset the evaporation of HOCl from treated water. In fact, the concentration of HCl maintained in the acid tank may be adjusted to facilitate maintaining the desired pH in water treated by chlorine generated by the methods taught in this invention.

Addition of the NaOH generated by the electrolysis of NaCl to the water being treated provides a simple method of neutralizing the acidity of the chlorine that is being produced. However, as is well known to those skilled in the art, the presence of a suitable buffering agent is important for stabilizing the pH of the water being treated. The buffer prevents large fluctuations in the pH that can result from relatively small, uncompensated additions of a strong acid or base. It is thus advantageous to have a simple method of adding sodium bicarbonate (the most economical buffer for maintaining the pH in the range of 7.5) to the water being treated along with the products of the operation of the chlorine generator. We take advantage of the reaction between carbonate ion and chlorine in aqueous solution:

$$Cl_2 + H_2O + CO_3^{-2} \rightarrow HOCl + HCO_3^- + Cl^- \qquad (3)$$

Thus, in the treated water the excess chlorine formed by electrolysis of the HCl reacts with the sodium carbonate to form sodium bicarbonate, a buffering agent, together with HOCl that acts to offset the HOCl that evaporates. This invention facilitates the frequent (i.e., daily to weekly) addition of sodium carbonate to the products of an electrolytic chlorine generator as a means of maintaining the desired concentration of buffering agent in the water being treated to maintain its pH at the desired value.

Finally, it is well known that the consumption of chlorine in water exposed to sunlight, such as in an outdoor swimming pool, is greatly reduced by the presence of cyanuric acid, $H_3C_3N_3O_3$. Cyanuric acid in water forms a complex with chlorine that retains chlorine's biocidal activity while reducing its photolytic degradation. Cyanuric acid is a granular solid that is only sparingly soluble in water, about 2000 parts per million (ppm). Although its optimal concentration for chlorine stabilization, about 50 ppm, is well below its solubility, the mechanics of dissolving cyanuric acid in a swimming pool is nevertheless difficult. In swimming pool water, pH about 7.5, cyanuric acid is actually in the form of the monovalent anion, $H_2C_3N_3O_3^-$. The divalent anion is the primary species in aqueous solution when the pH reaches about 12. These anions are generally associated with one or two sodium ions to form the respective sodium salts. Of the two sodium salts, only the latter, $Na_2HC_3N_3O_3$, is substantially more soluble than $H_3C_3N_3O_3$ itself. Experiments show that its solubility exceeds 30,000 ppm at pH 12.5. Because of the high pH required to form $Na_2HC_3N_3O_{O3}$, only a solution of NaOH is sufficiently basic to aid in solubilizing cyanuric acid. A solution of sodium carbonate is ineffective for this purpose. We have found that the catholyte product of the electrolysis of sodium chloride brine, the dilute solution of NaOH described above, is ideally suited for dissolving $H_3C_3N_3O_3$. This invention provides a simple means of dissolving cyanuric acid in the solution of NaOH produced by an electrolytic chlorine generator prior to injecting that caustic solution into the water being treated.

The elements of a device for achieving the objectives of this invention are shown schematically in FIG. 1. The elements consist of a constant-head acid tank 10, a salt/brine tank 20, a membrane-type electrolytic cell 30, a caustic tank 40, a mixing tank 50, a pump 60 for injecting the products of electrolysis into the water being treated, a caustic-density sensor/controller 70 for maintaining the sodium hydroxide product at a desired concentration, and a system 80 for ensuring a flow of air to sweep chlorine fumes from the system. Preferably, the piping and tanks of the system are made primarily of polyvinyl chloride pipe and plate. The elements are interconnected, and operate as follows: At the start of a run, acid tank 10 is initially filled with a dilute solution of hydrochloric acid 11 through inlet 12 while acid valve 16 is closed. As another part of the (re)filling procedure, brine remaining in salt/brine tank 20 from the preceding run is emptied through valve 23. Salt tank 20 is then refilled with solid sodium chloride 21 in a suitable form, e.g. crystals or pellets of preferably about 2 mm to 20 mm in size. A measured volume of freshly prepared saturated brine 22 is then added to tank 20. The inlet 12 of tank 10 is then capped tightly and valve 16 is opened. A small quantity of hydrochloric acid 11 then flows from constant-head tank 10 through line 15 into tank 20. As the acid solution in tank 10 flows out through line 15, air is drawn down through tube 13 and the level of brine in tank 20 rises to a point approximately equal to that of the bottom of tube 13. The air space 14 above the liquid in tank 10 is then under a slight vacuum. The pressure at the bottom of tube 13 is that of the ambient atmosphere. In subsequent operation, as water is transported through the membrane of cell 30 by the flow of current, acid flows from tank 10 through line 15 and mixes with the brine in tank 20 while air is pulled into tank 10 to replace the acid. However, because the pressure at the bottom of tube 13 remains constant, the level of the brine in tank 20 remains constant, about even with the bottom of tube 13, until the liquid level in tank 10 drops to that point. At that time the run must be terminated and tanks 10 and 20 must be refilled as described above before operation of the system can be resumed.

Figure 2:
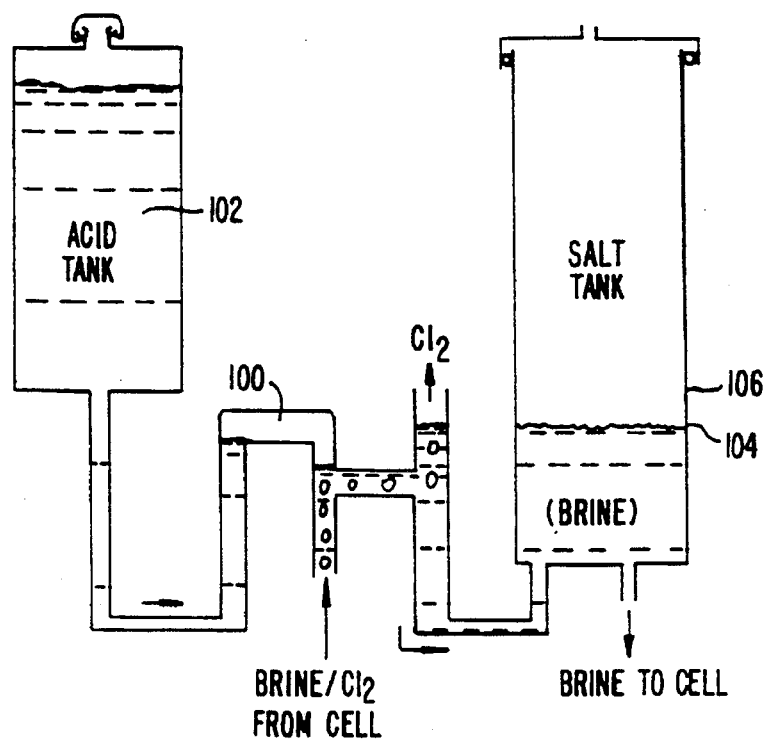
FIG. 2 is a drawing of a chlorine bubble check value in the line connecting an acid tank and a brine tank according to a preferred embodiment.

At the point where the dilute acid mixes with the brine in the brine tank, a small amount of dissolved chlorine gas is evolved. This gas may accumulate in the acid tank if allowed to flow back up the piping between the acid tank and the brine tank. Chlorine fumes will then be expelled when the acid tank is refilled, creating a nuisance and a slight loss of generated chlorine gas. To eliminate this problem, the acid and brine tanks may be connected by a line containing a chlorine bubble "check valve." As shown in FIG. 2, the check valve can assume the form of an "inverted gooseneck" in the line. The line extends below the brine surface 104 in the brine tank 106, so that chlorine gas collects in the inverted gooseneck section 100 but cannot rise into the acid tank 102.

Figure 3:
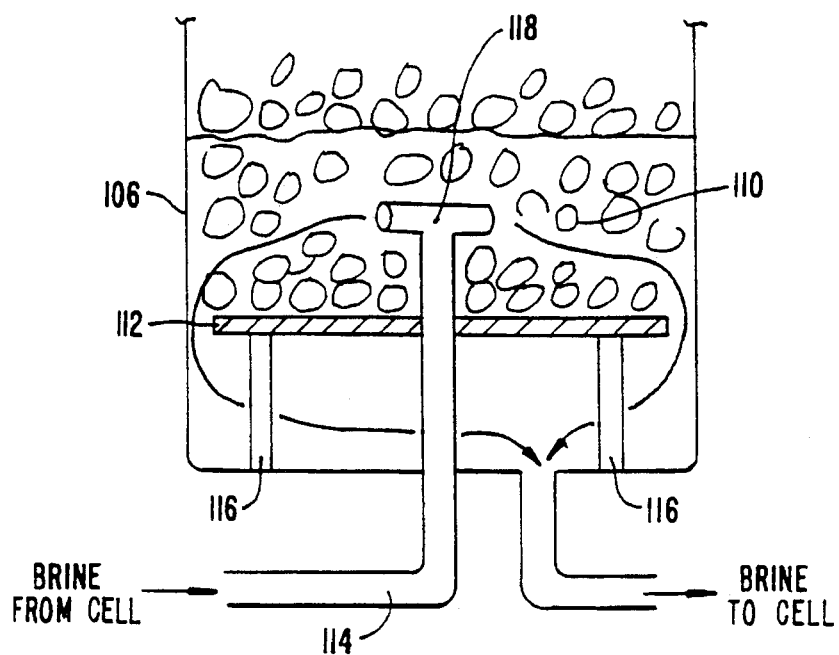
FIG. 3 is a drawing of a baffle support for solid sodium chloride in the brine tank.
Figure 4:
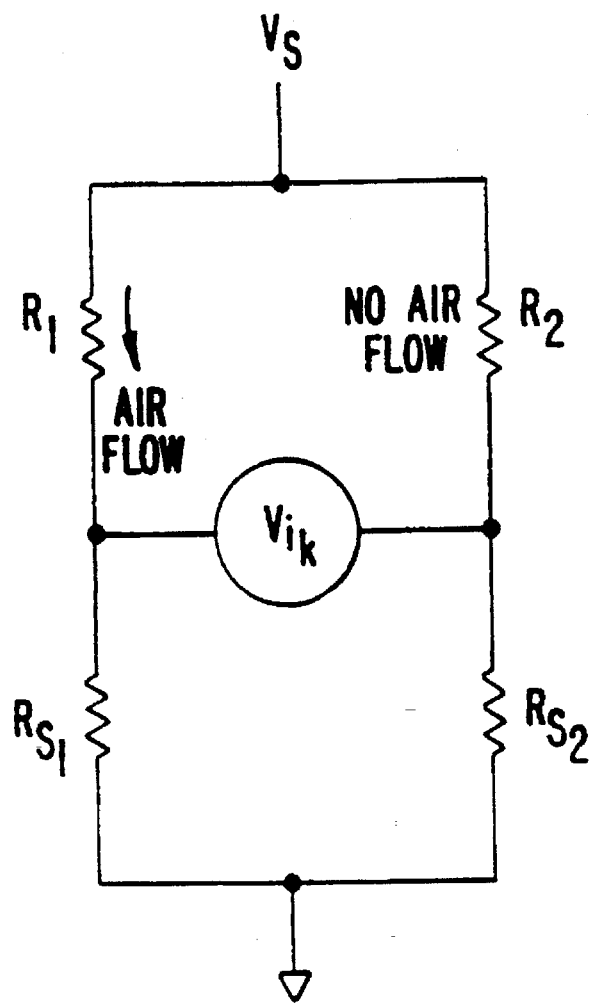
FIG. 4 is a schematic diagram of a hot-wire anemometer flow monitor of the present invention.

Referring to FIG. 3, solid sodium chloride crystals or pellets 110 in the brine tank 106 extend into the air space above the brine. As electrolysis proceeds, the salt pellets in the brine dissolve causing the pellets in the air space to descend into the brine. To prevent fine grains of salt from being swept from the tank into the piping leading to the cell, or from accumulating in the bottom of the tank, the salt pellets may be supported on a baffle 112.

The baffle preferably consists of a disk perforated by a brine return line 114 held above the bottom of the tank by supports 116. As shown, salt pellets rest on the disk. Sub-saturated brine returns from the cell and is distributed into the salt bed by a tee at the top of pipe 118. The brine flows through the salt bed and down through the gap between the salt baffle and the tank wall. Because of the relatively high velocity of brine circulation, the brine is never completely saturated. Thus, salt fines dissolve instead of building up and being carried through the system.

Referring again to FIG. 1, line 34 from tank 20 feeds saturated brine to the bottom of the anode compartment 31 of electrolytic cell 30. In the anode compartment, as the result of electrolysis, chlorine gas forms at the anode 38, sodium ions and water pass through the membrane 33, and a foam of chlorine gas and brine flows from the top of the cell through line 35 to the chlorine-disengagement compartment 25. The product stream of chlorine gas 26 flows from the top of compartment 25 while the brine stream from the bottom of 25 returns to tank 20 through line 24. In tank 20, solid salt 21 dissolves in the brine to replace the NaCl that was consumed by electrolysis. The inventory of coarse salt crystals or pellets, most of which are located in the air space above the brine, descends into the brine as salt is dissolved. The circulation of brine between tank 20 and anode compartment 31, described above, is caused by the gas-lift effect of the chlorine bubbles.

As was noted above, the level of brine in tank 20 is maintained constant as long as an inventory of acid remains in tank 10, since the current-induced flux of water through the membrane of electrolytic cell 30 is matched by an inflow of acid from tank 10 through line 15. The concentration of acid in tank 10 is adjusted to maintain the pH of the brine in tank 20 at about the desired level, e.g. below about pH 4.0. Preferably, 10% to 20% of the chlorine formed in cell 30 results from the electrolysis of HCl.

Line 36 from caustic tank 40 feeds a dilute solution of sodium hydroxide (NaOH or "caustic") to the bottom of the cathode compartment 32 of cell 30. In the cathode compartment, as a result of electrolysis, hydrogen gas and NaOH are formed from the water and sodium ions transported through membrane 33 from the anode compartment 31. A foam of caustic solution and hydrogen gas flows from the top of the cathode compartment through line 37 back to caustic tank 40 where the hydrogen bubbles disengage and leave from the top as the hydrogen product stream through line 41. The aqueous solution of caustic circulates between the cathode compartment of cell 30 and caustic tank 40 because of the gas-lift effect of the hydrogen bubbles.

Within tank 40 is located the working parts of a caustic-density sensor/controller 70 that regulates a flow of water through valve 75 and line 74 into tank 40, thereby maintaining the concentration of the NaOH in the product caustic at the desired value. This value has been determined to be optimal in the range 2 to 10% by weight. One device suitable for controlling the caustic density consists of a rod 72, placed in caustic tank 40, on which are mounted two cylindrical floats, 71 and 73, which are free to move up and down. Stop-disks, 76, mounted on rod 72 prevent the floats from interfering with each other or from becoming separated from rod 72. Cylindrical float 71 is constructed to have a bulk density close to the desired density of the NaOH solution, e.g. 1.065 g/mL for 6.0% NaOH by weight. Float 71 contains a magnet—preferably a balanced array of two or more permanent magnets (not shown). An axial hole in the float allows it to move up or down hollow rod 72 along a defined distance defined by stop-disks 76 in response to a change in NaOH concentration. As long as the concentration of NaOH in tank 40 is equal to or less than the desired value, float 71 rests on the lowest stop-disk 76 mounted on rod 72 and valve 75 remains closed. If the concentration of the caustic solution significantly exceeds the desired value, float 71 rises and a magnetic switch (not shown) within rod 72 acts through sensor 70 to open valve 75, causing a flow of diluent water to mix with the NaOH solution entering tank 40. When the caustic solution has been diluted to a concentration significantly below the desired value, float 71 sinks and the magnetic switch in rod 72 acts through sensor 70 to close valve 75. A second float, 73, with a construction similar to that of float 71 but with a bulk density slightly below that corresponding to a selected maximum NaOH concentration, e.g. 10%, is located on rod 72 above first float 71. Its presence is a safety factor since it will rise only if there is a malfunction in the control system, such as a plugged water line. Its rising triggers a second magnetic switch (also not shown) within rod 72. The closing of this second switch acts through sensor 70 to shut off the power to chlorine cell 30 and to activate an alarm.

It should be noted that the density-control device described by Keller (U.S. Pat. No. 4,899,774 [1990]) incorporates a conventional hydrometer, a bulb with a stem, that floats in the NaOH solution produced by the electrolytic cell. The stem rises above the surface of the NaOH solution as the density of the solution (i.e., the NaOH concentration) increases. As the stem rises, it intersects a small jet of water and deflects the water into the NaOH solution being circulated through the cathode compartment of the electrolytic cell, diluting the solution and bringing the concentration back into the desired range. A primary disadvantage of Keller's device is the need to maintain the flow of the water jet at all times. For reasons of economy the water stream must consist of recycled pool water; pool water typically contains relatively high concentrations of calcium and magnesium ions, which form insoluble, scale-forming deposits when added to a solution of NaOH. These deposits may cling to various parts of the equipment, including the hydrometer, and will eventually interfere with its operation.

The diluent water added to the circulating sodium hydroxide stream must be well mixed with the sodium hydroxide solution in order for the density sensor to function properly. A convenient method for assuring adequate mixing is to pipe the diluent water into the line that returns sodium hydroxide solution from the cell back to the caustic tank. Of course, other mixing systems that are well known in the art may also be employed.

Chlorine fumes are swept from the air space in tank 20 by a stream of air that enters tank 20 through line 82 and exits through line 27. The chlorine, air and chlorine fumes flowing in lines 26 and 27 are combined with the hydrogen stream 41 leaving tank 40 and are pulled into pumping device 60 through line 44. It is imperative for the safe and effective operation of the chlorine generator that pumping device 60 always maintain a flow of sweep air through the system to assure that the products of electrolysis are being injected into the water stream being treated and that no chlorine fumes can escape from the system. For this reason, the lid 81 covering tank 20 is sealed and the flow of air into tank 20 through line 82 is sensed by a flow monitor 80. If the flow falls below the desired rate (about one liter per minute), power to the chlorine generator is turned off and an alarm is sounded.

Several types of air-flow monitors are well known to those skilled in the art. However, one type, which we have found to be particularly effective, uses a heated wire (a "hot-wire anemometer") as a means to meter the air flow. The wire is inserted in line 82, which carries air into tank 20. An electric current passes through the wire in response to a constant voltage applied to it. The temperature of the wire falls when the air flow past the wire increases. The electrical resistance of the wire decreases with decreasing temperature, producing a corresponding increase in the current passing through the wire. A wiring diagram for a "Wheatstone bridge" suitable for measuring the change of electrical current is shown in FIG. 2. A constant voltage $V_s$, e.g. 5 volts, is applied across the bridge. Resistor $R_1$, the anemometer, is placed in position in the pipe and a comparison resistor, $R_2$, is placed in a sheltered location. $R_1$ and $R_2$ have nominally the same resistance, e.g. 28 ohms, when no current is flowing. Two standard precision resistors, $R_{s1}$ and $R_{s2}$, having equal resistances of e.g. 22 ohms, are connected to $R_1$ and $R_2$ respectively. A high-impedance voltage indicator/controller, $V_{i/c}$, connecting the junctions between $R_1/R_{s1}$ and $R_2/R_{s2}$ responds to a difference in the currents flowing through $R_1/R_{s1}$ and $R_2/R_{s2}$.

A metered flow of air of e.g. one liter/minute is then passed through the anemometer and the low-flow set point of the controller ($V_{i/c}$) is determined. During operation of the chlorine generator, the reading of $V_{i/c}$ is compared electronically with the original value of the low-flow set point for indication that the flow of sweep air has fallen below the safe limit. The chlorine generator is turned off if $V_{i/c}$ falls below the set-point value.

Returning again to FIG. 1, the net caustic product stream 43 flows from tank 40 to mixing tank 50. As was noted above, mixing tank 50 provides a convenient point at which desired water-treatment chemicals, such as sodium carbonate, sodium hypochlorite, sodium bicarbonate, calcium hypochlorite, chlorinated cyanuric acid, or cyanuric acid, may be added as needed. Such chemicals are typically added daily or weekly although continuous addition would usually be preferred. When added to mixing tank 50 these chemicals dissolve slowly in the caustic product leaving tank 40 and hence are added to the treated water over a period of some hours as the liquid product stream 51 overflows from mixing tank 50 through line 52 to pump 60. (Sodium hypochlorite, which only exists in aqueous solution, is added at less frequent intervals to provide shock chlorination to a swimming pool.) In preferred embodiments, the solid water-treatment chemicals (cyanuric acid and sodium carbonate) are periodically added to mixing tank 50 in the form of pellets or granules. The amount of solid chemicals in individual pellets is dictated by the rate at which these chemicals are removed from the water being treated. For swimming pools, this depends, in part, on the size of the pool and frequency of use.

Pumping device 60 injects the gases from line 44, together with the NaOH-containing product stream 52, into the stream of water 61 being treated. Pump 60 must thus be capable of pumping both gas and liquid streams from the chlorine generator into the stream of water being treated. This device, most conveniently, consists of a jet pump that operates by the Venturi principle. A jet pump has no moving parts and can be fabricated of material resistant to attack by aqueous chlorine solutions (e.g. poly(vinyl chloride), PVC). The motive fluid for the jet pump is the stream (or a side stream) of the water to be treated, 61. The velocity of the motive fluid through the jet must be sufficient to induct the product caustic stream from line 43, the product chlorine stream from line 26, the product hydrogen stream from line 41, and a sweeping flow of air from line 28 that prevents chlorine fumes from escaping from salt/brine tank 20. Other pumping devices capable of injecting these streams into the treated water are well known to those skilled in the art.

As was noted above, it is desirable to provide a molar amount of phosphate species (predominantly in the form of $H_3PO_4$ and $H_2PO_4^-$ ion) that is at least equal to the maximum combined molar amount of calcium and magnesium ions that will be present during operation of the unit. Preferably, the phosphate species is provided at between about 1.5 and 2.5 times the combined molar amount of calcium and magnesium ions, and most preferably at about twice the combined molar amount of calcium and magnesium ions. The calcium and magnesium ions generally enter the generator through two sources: (1) the solid salt loaded into tank 20, and (2) the water used to dilute the hydrochloric acid in tank 10 to the desired concentration. The concentrations of calcium and magnesium in the anolyte brine thus rise over the period of time required to consume the salt and acid initially loaded into tanks 10 and 20. (At the end of that period the anolyte brine is discarded and the system is reloaded.) The desired concentration of phosphate species can be maintained in the anolyte brine in any of three ways: a) by adding a phosphate salt, such as $Na_3PO_4$, $Na_2HPO_4$, $NaH_2PO_4$, or $NaPO_3$ to the solid sodium chloride loaded into salt/brine tank 20 and/or b) by adding phosphoric acid to the hydrochloric acid loaded into tank 10 and/or c) by adding phosphoric acid or a sodium phosphate to the brine initially charged to brine salt/brine tank 20 at the beginning of a run. In all of these cases, the measured amount of phosphate species added will be based on the calcium and magnesium analyses of the solid sodium chloride, and the local tapwater. For case b), the quantity of phosphoric acid would also be based on the known rate of water transport through the cell membrane, which is about four water molecules per Faraday of electric current. In some preferred embodiments of method a), phosphate salt is added with NaCl in the form of pellets. With methods a) and b), the phosphate is delivered at the same rate as the calcium and magnesium entering the brine tank. With method c), there is initially an excess of phosphate in the brine which gradually diminishes as the acid tank empties. This excess phosphate has not been observed to be a problem.

If the chlorinator of this invention is made from polyvinyl chloride, it is important to adequately cool the system. Specifically, it is desirable to maintain the temperature below about 40° C. as polyvinyl chloride softens and can distort at temperatures much above 60° C. Preferably, temperature control is facilitated by placing a cooling coil in the sodium hydroxide tank and/or in the brine tank. In either location, the coil should be situated in an area of relatively rapid flow. The coil in the sodium hydroxide tank is preferably made of stainless steel, polyethylene, or polypropylene tubing. The coil in the brine tank is preferably made of Teflon or other material resistant to chlorinated brine. The coil in the sodium hydroxide tank can conveniently be located next to the tank wall surrounding the sodium hydroxide density sensor described above. The coil in the brine tank can conveniently be incorporated into the supports of the salt baffle described above. The water stream used to drive the jet pump may also be used as coolant in the cooling coils.

Although the foregoing invention has been described in some detail by way of illustration and example, for purposes of clarity of understanding, it will be apparent that certain changes and modifications may be practiced within the scope of the appended claims. For example, although a preferred chlorine generator has been described as useful for water treatment, other uses such as preparation of bleach (3 to 10% by weight sodium hypochlorite) may also be practiced with the present invention. Bleach is commonly used for household laundry and for cleaning dairy equipment, among other applications.

It will also be apparent that although the improvements described above offer advantages in terms of the efficiency and/or safety of operating an electrolytic chlorine generator, many of them may be deleted without rendering such a generator inoperable. Thus the use of some but not all of these improvements still falls within the scope of this invention. In fact, the operation of conventional chlorine generators can, in many cases, be improved by employing one or more of the improvements described herein.

What is claimed is:

1. A caustic tank controller which regulates the concentration of caustic in a caustic tank, the controller comprising:
   (a) a rod vertically disposed within the caustic tank, the rod having a magnetically actuated switch therein;
   (b) control means for regulating the flow of water into the caustic tank, the control means responding to said magnetically actuated switch;
   (c) a float having a magnet mounted therein and an axial hole, the float being mounted on the rod such that it is free to move along a defined length of the rod in response to buoyant forces; and
   (d) stop-disks affixed to the rod at locations above and below the float at the ends of said defined length such that the float is constrained from further movement along the rod when the float encounters one of the stop-disks, wherein the float has a bulk density substantially equal to a desired density of the caustic in the caustic tank so that the float rises in response in increased caustic concentration and thereby actuates the magnetically actuated switch and causes water to flow into the caustic tank.

2. A caustic tank controller which regulates the concentration of caustic in a caustic in a caustic tank, the controller comprising:
   (a) a rod vertically disposed within the caustic tank, the rod having a magnetically actuated switch therein;
   (b) control means for regulating the flow of water into the caustic tank, the control means responding to said magnetically actuated switch;
   (c) a float having a magnet mounted therein and an axial hole, the float being mounted on the rod such that it is free to move along a defined length of the rod in response to buoyant forces;
   (d) stop-disks affixed to the rod at locations above and below the float at the ends of said defined length such that the float is constrained from further movement along the rod when the float encounters one of the stop-disks, wherein the float rises in response to increased caustic concentration and thereby actuates the magnetically actuated with and causes water to flow into the caustic tank; and
   (e) a second float mounted on the rod and a second magnetically actuated switch in the rod, the second magnetically actuated switch triggering an alarm when the second float rises above a predetermined level on the rod.

3. A caustic tank controller which regulates the concentration of caustic in a caustic tank, the controller comprising:
   (a) a rod vertically disposed within the caustic tank, the rod having a magnetically actuated switch therein;
   (b) control means for regulating the flow of water into the caustic tank, the control means responding to said magnetically actuated switch;
   (c) a float having a magnet mounted therein and an axial hole, the float being mounted on the rod such that it is free to move along a defined length of the rod in response to buoyant forces;
   (d) stop-disks affixed to the rod at locations above and below the float at the ends of said defined length such that the float is constrained from further movement along the rod when the float encounters one of the stop-disks, wherein the float rises in response to increased caustic concentration and thereby actuates the magnetically actuated switch and causes water to flow into the caustic tank;
   wherein the caustic tank is coupled with a cathode compartment of a chlorine generating electrolytic cell such that caustic solution is recycled between the caustic tank and the cathode compartment.

4. The caustic tank controller of claim 3 further comprising means for automatically shutting down the cell if the caustic concentration in the cathode compartment exceeds a threshold value.

* * * * *